United States Patent
Hsiao et al.

(10) Patent No.: US 12,253,474 B2
(45) Date of Patent: Mar. 18, 2025

(54) DETECTION METHOD AND SYSTEM FOR DETERMINING THE LOCATION OF A SURFACE DEFECT ON A FRONT OR BACK SURFACE OF A TRANSPARENT FILM

(71) Applicant: HUA YANG Precision Machinery Co., Ltd, Tainan (TW)

(72) Inventors: Hsien-Te Hsiao, Tainan (TW); Hsuan-Fu Wang, Tainan (TW)

(73) Assignee: HUA YANG Precision Machinery Co., Ltd, Tainan (TW)

( * ) Notice: Subject to any disclaimer, the term of this patent is extended or adjusted under 35 U.S.C. 154(b) by 162 days.

(21) Appl. No.: 18/126,611

(22) Filed: Mar. 27, 2023

(65) Prior Publication Data
US 2024/0094145 A1     Mar. 21, 2024

(30) Foreign Application Priority Data
Sep. 15, 2022  (TW) .................................. 111134859

(51) Int. Cl.
*G01N 21/958*     (2006.01)
*G01N 21/88*      (2006.01)

(52) U.S. Cl.
CPC ....... *G01N 21/958* (2013.01); *G01N 21/8851* (2013.01); *G01N 2021/8854* (2013.01); *G01N 2021/8887* (2013.01)

(58) Field of Classification Search
CPC ............ G01N 21/958; G01N 21/8851; G01N 2021/8854; G01N 2021/8887
See application file for complete search history.

(56) References Cited

FOREIGN PATENT DOCUMENTS

| JP | H1062354 A | * 3/1998 | ............. G01N 21/88 |
|----|-----------|----------|------------------------|
| TW | 202018279 | 5/2020 | |

* cited by examiner

*Primary Examiner* — Jamil Ahmed
(74) *Attorney, Agent, or Firm* — WPAT, PC

(57) ABSTRACT

A method and system for detecting the location of a surface defect on a transparent film with respect to whether the surface defect is at a front or back surface of the film. By illuminating the surface defect with a light source from an oblique angle and capturing an image of the surface defect using a camera which is positioned along an axis where the light illuminates after unobstructedly reflected from the test surface of the film, and using the reflected light, an image of the surface defect is obtained. A computer executes an evaluation logic to determine whether the image of the defect contains any dark area. If there is a dark area present, the defect is judged to be on the front surface of the film. If there is no dark area present, the defect is judged to be on the back surface of the film.

10 Claims, 15 Drawing Sheets

DETECTION METHOD AND SYSTEM FOR DETERMINING THE LOCATION OF A SURFACE DEFECT ON A FRONT OR BACK SURFACE OF A TRANSPARENT FILM

FIELD OF THE DISCLOSURE

The present disclosure is related to the technology of detecting a surface defect on a transparent film, and specifically referring to a detection method and system for determining the position of the surface defect on the transparent film with respect to locating at a front or back surface of the transparent film.

BACKGROUND OF THE DISCLOSURE

Taiwan Patent No. 202018279 (Application No. 108120821) disclosed a particle depth classification technology based on multiple scattered signals, which is an embedded technology. This technology focuses on defects of the semiconductor device (such as 3D memory stacking) as illuminated by the light source obliquely, and uses two different illuminating beams to adjust the light source through similar components such as lenses or polarizers in the adjusting components. The defects then produce scattering or refraction, and two different detectors are used to image and determine the defect depth of the defects.

In the aforementioned technology as shown in FIGS. 1B and 1C, the light source is obliquely illuminated, and the imaging can be obliquely imaged or vertically imaged from top to bottom. As a result, the focus is on obtaining the light scattered or refracted after the defect, and the purpose is to determine the defect depth of the defect.

The aforementioned technology is mostly applicable in detecting defects of semiconductor devices and determining their depth. As shown in FIG. 1C of the aforementioned case, the two sets of detectors and the two sets of lighting beam adjustment components are imaged onto the sample by using a mirror (or a half-mirror) on the same optical axis. Therefore, in the imaging process, the results of determining the defect depth can only be achieved by matching the two sets of detectors and the two sets of lighting beam adjustment components.

For a transparent film, such as a light mask, it is very important to determine whether the defect or flaw is on the film's front or back surface, because if the flaw is on the front surface, it means that the flaw can be removed during cleaning the surface, but if the flaw is on the back surface, then it is of another cleaning issue. Therefore, determining the position of the flaw on the film's front or back surface is a very important requirement for the transparent film.

Due to the reflection of light on the transparent film surface, the detection technology as described above will not only detect the reflection and scattering of defects, but also the reflection of the transparent film surface when used on the transparent film surface. Such will cause the image to become blurred and it will be difficult to determine the depth of the defect. Therefore, there is a problem of poor detection results for the defect on the front surface of the transparent film, and for the defect on the back surface of the transparent film, it is even more likely to be more blurred due to the more reflection of light on the back surface of the transparent film, which makes it more difficult to determine if the defect is on the back surface of the transparent film.

SUMMARY OF THE DISCLOSURE

It is therefore an object of the present disclosure to provide a detection method and system for determining whether a surface defect on a transparent film is located on a front or back surface of the transparent film. This method and system can effectively determine the location of the surface defect on the transparent film.

Another object of the present disclosure is to provide the detection method and system for determining whether the surface defect on the transparent film is located on the front or back surface of the transparent film that uses a simpler structure as compared to a conventional method and system, and yet still effective in determining the location of the surface defect on the front or back surface of the transparent film.

To achieve the above-mentioned objects, the method for detecting the position of the surface defect on the transparent film with respect to locating on the front or back surface of the transparent film is provided. The method includes: (A) preparing step: prepare the transparent film using a test surface, which has at least one surface defect of which its position on the transparent film known and fixed, but the position of the surface defect at the front or back surface of the transparent film is unknown, and prepare a light source that shines on the test surface with a light direction and at an angle of less than 45 degrees with respect to the test surface; (B) illuminating and imaging step: use the light source to shine light on the test surface in accordance with the position of the at least one defect, and use a camera to image the surface defect, whereby the camera is located on an axis where the light that shines on the test surface is not obstructed when reflected, and the projection angle is adjusted based on the surface reflectivity of the transparent film in order to obtain an image from the camera using the light reflected from the front and back of the test surface whereby more than 70% of the light is reflected from the transparent film; and (C) detecting and judging step: use a computer to execute an evaluation logic to judge the image, and the content of the evaluation logic is that if there is a dark area in the image, then it is determined that the at least one defect corresponding to the at least one image is on the front surface of the transparent film, and has a predetermined thickness, and if there is no dark area in the image, then it is determined that the at least one defect corresponding to the at least one image is on the back surface of the transparent film.

Using a simple structure and through the aforementioned steps, the present disclosure can effectively determine whether the surface defect is located on the front or back surface of the transparent film.

In addition, the present disclosure provides a detection system for determining the location of the surface defect on the transparent film, either on the front or back surface of the film, by carrying out the above-mentioned steps and further includes: a movable inspection platform for placing the transparent film, which has the test surface and at least one defect, with the coordinate of the at least one defect on the transparent film fixed and stored in a computer, and the movable inspection platform being controlled by the computer to drive the transparent film to move in the X and Y directions; a light source for emitting light in a direction perpendicular to the test surface and at an angle less than 45 degrees to the test surface, and onto the at least one defect when the movable inspection platform moves the transparent film to align the fixed coordinate position of the at least one defect with the illumination position of the light source; and a camera, which takes images of at least one defect, where the camera is located on the axis of the light that is illuminated after the light emitted by the light source is unobstructedly reflected by the test surface in order to obtain at least one image to be evaluated. The angle of illumination is adjusted based on the surface reflectivity of the transparent film in order to obtain an image of which more than 70% of the light is reflected by the transparent film. The computer then performs an evaluation logic to evaluate the at least one image. The content of the evaluation logic is as follows: if there is a dark area in the at least one image to be evaluated, the computer determines that the at least one defect corresponding to the at least one image is located on the surface of the film and has a predetermined thickness. If there is no dark area in the at least one image, then it is determined that the at least one defect corresponding to the at least one image is located on the back surface of the transparent film.

Through the above-mentioned system, the present disclosure can achieve the effect of using a simple structure to effectively determine whether the defect is located on the front or back surface of the transparent film.

Figure 1:
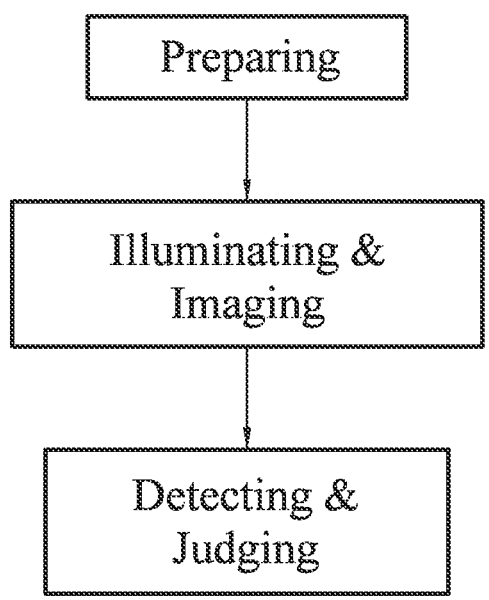
FIG. 1 is one flowchart of a first preferred embodiment of the present disclosure.
Figure 2:
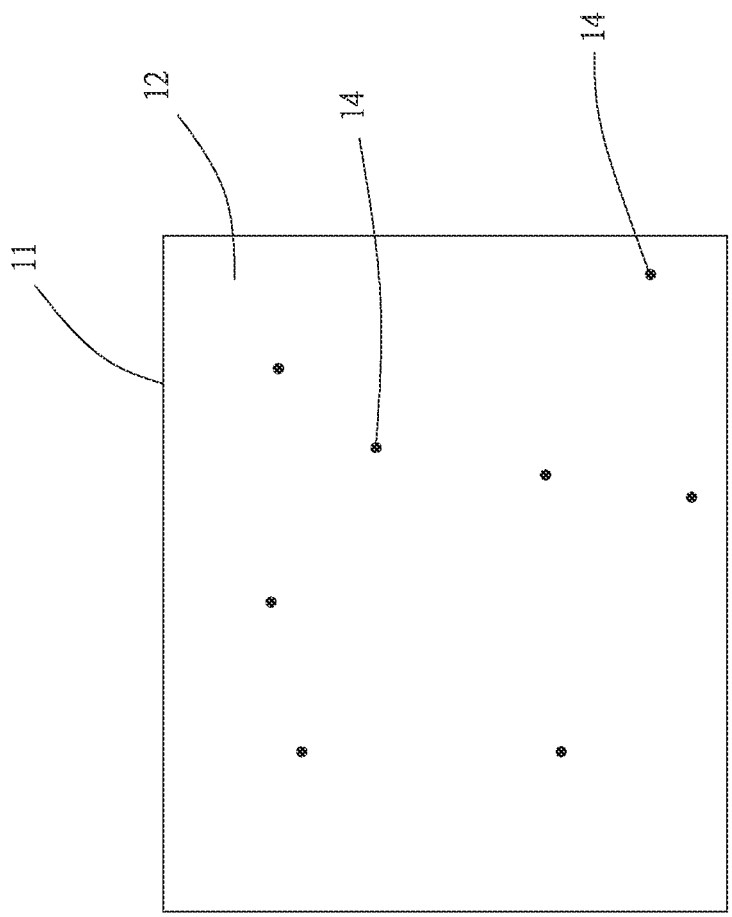
FIG. 2 is a schematic diagram of the transparent film of the first preferred embodiment of the present disclosure.

In the various figures of the drawings, reference numbers are used to designate parts as follows: detection system 10; transparent film 11, front surface 12; back surface 13; surface defect 14, light source 21; side light source 26; camera 31; image 32; side camera 36; side image 37; computer 41, evaluation logic 42, movable inspection platform 91; light axis A or A'; dark area DA or DA'; and projection angle θ.

DETAILED DESCRIPTION OF THE EXEMPLARY EMBODIMENTS

In order to elaborate on the technical features of the present disclosure, the following exemplary implementation will be given with reference to the accompanying drawings as follows:

As shown in FIGS. 1 to 9, the first best implementation of the present disclosure proposes a detection method and system for determining the location of defects on the surface of a transparent film, either on the front or back surface of the transparent film. The method and system include the following steps:

Preparing step (A): Prepare a transparent film 11, such as a photomask, having a front surface 12 (also referred to as a "test surface") to be inspected. The transparent film 11 has one or more surface defects 14, and some of which may be of dust or oil stains and located on the front surface 12 of the transparent film 11. Some of the surface defects 14 can be of black spots, bubbles, or unidentified particles located below the front surface 12 of the transparent film 11. The coordinates of the surface defects 14 on the transparent film 11 are fixed, and in practice, the coordinates for each of the surface defects 14 can be identified and recorded by automatic optical inspection (AOI) technology prior to inspection. However, at this stage, although the coordinates for each of the surface defects 14 are fixed, their locations at the front or back surface of the transparent film 11 is unknown. In this step (A), a light source 21 is prepared to illuminate the front surface 12 to be inspected at a projection angle θ with respect to the illumination direction and front surface 12. In this embodiment, the projection angle θ is 30 degrees, and the projection angle θ is adjusted based on the reflectivity of the surface of the transparent film 11 so that one part of light is reflected on the front surface 12 to be inspected of the transparent film 11, and another part of the light penetrates the front surface 12 and is reflected on a back surface 13 of the transparent film 11. In practice, the light source 21 may also be a suitable light source 21, such as S-polarized light, to take advantage of its easier reflection from the surface of the transparent film 11. Also in practice, the projection angle θ can be adjusted depending on the type of the light source 21. For light that is more easily reflected, the projection angle θ can be greater than 30 degrees, and even at 45 degrees is possible.

Illuminating and imaging step (B): The light source 21 is used to sequentially illuminate the surface defects 14 at the fixed coordinates on the front surface 12 of the transparent film 11, and a camera 31 is used to take an image of each of the surface defects 14 one by one. During the sequential illumination and imaging process, the camera 31 is maintained on the light axis A where the light should be illuminated after it is reflected unobstructedly by the front surface 12 in order to obtain multiple images 32 corresponding to each of the surface defects 14. The projection angle θ is adjusted based on the surface reflectance of the transparent film 11. Therefore, for the front surface 12 or the back surface 13 of the transparent film 11, the projection angle θ is adjusted to ensure that more than 70% of the light is reflected by the transparent film 11 for the image obtained by the camera 31.

Detecting and judging step (C): A computer 41 operates based an evaluation logic 42 to respectively judge each of the images 32. The content of the evaluation logic 42 is as follows: If there are dark regions DA in each of the images 32, then it is judged that the surface defect 14 corresponding to the image 32 is located on the front surface of the transparent film 11 and has a predetermined thickness. If there are no dark regions DA in each of the images 32, then it is judged that the surface defect 14 corresponding to the image 32 is located on the back surface of the transparent film. In practice, the computer 41 can also be an industrial computer or other similar operation processing system, and is not limited to a personal computer.

Figure 6:
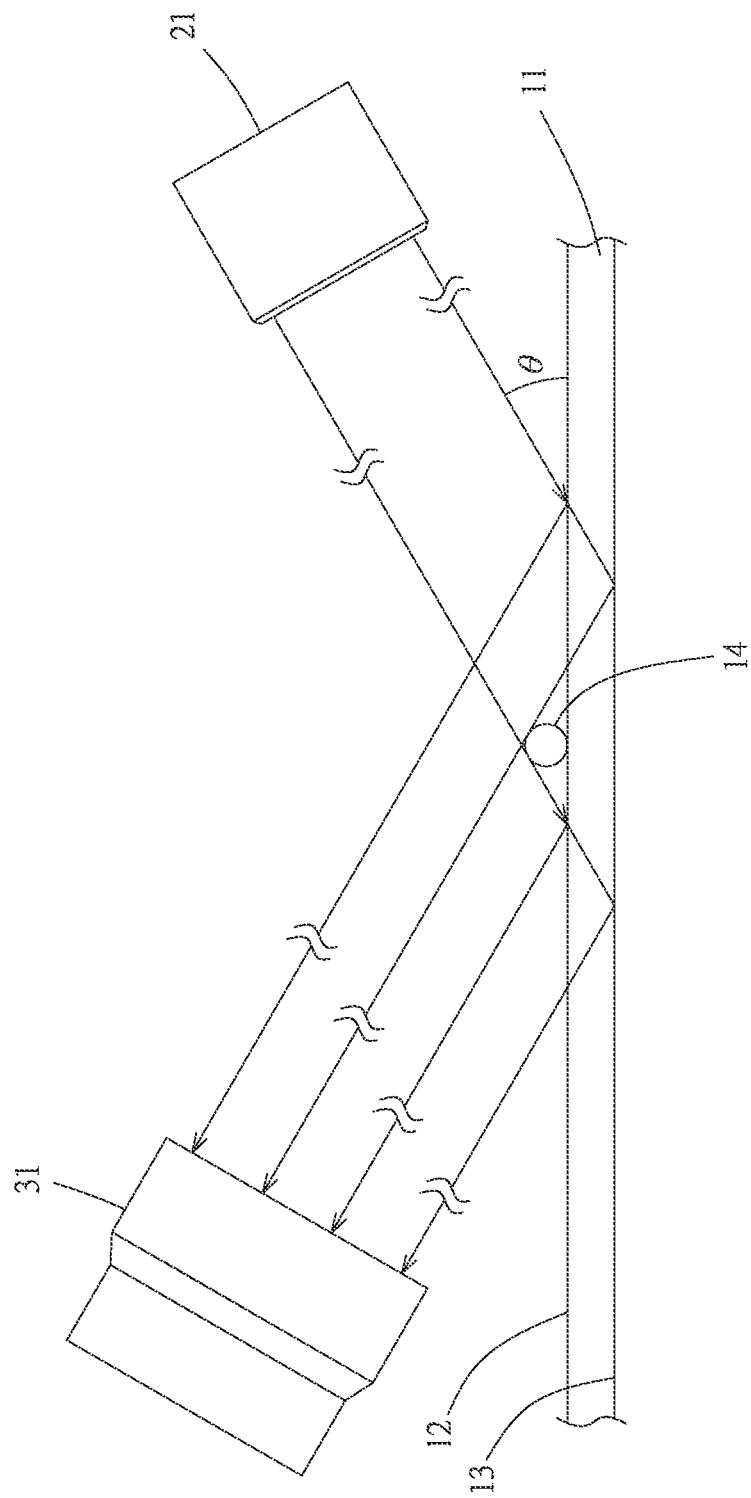
FIG. 6 is a schematic diagram of another action of the first preferred embodiment of the present disclosure, showing another detection status on a surface defect at a front surface of the transparent film.
Figure 7:
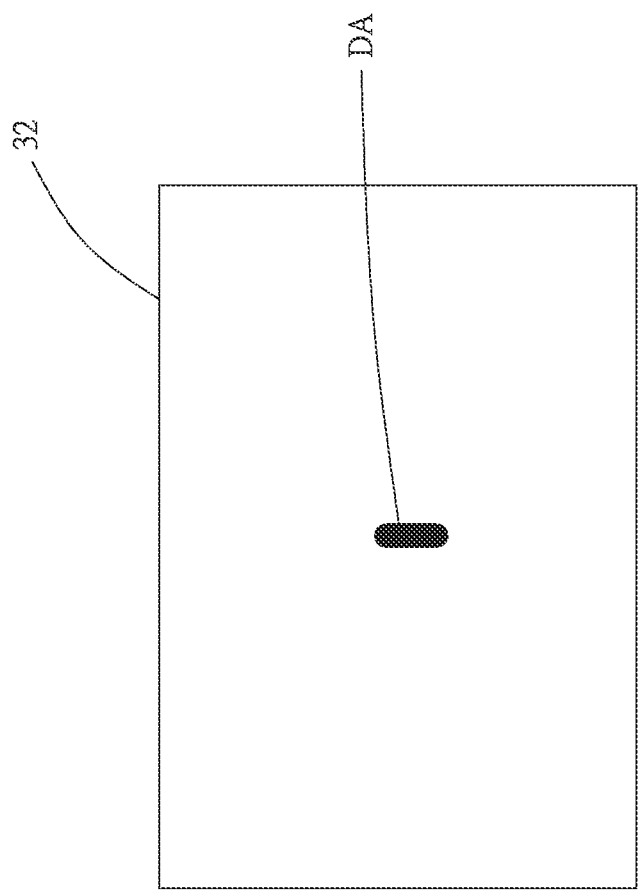
FIG. 7 is a schematic diagram shown one detected image according to FIG. 6.
Figure 8:
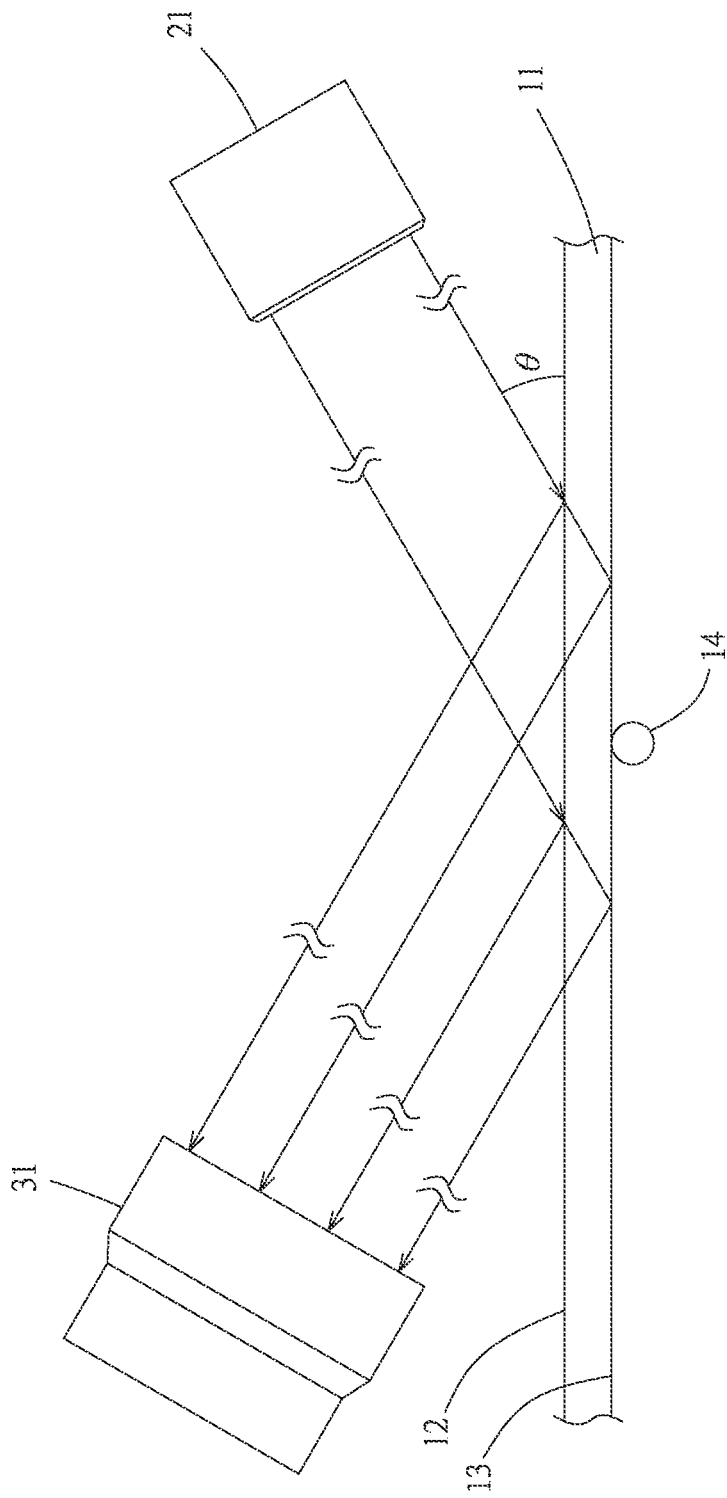
FIG. 8 is another schematic diagram of the first preferred embodiment of the present disclosure, showing another detection status on a surface defect at a back surface of the transparent film.
Figure 9:
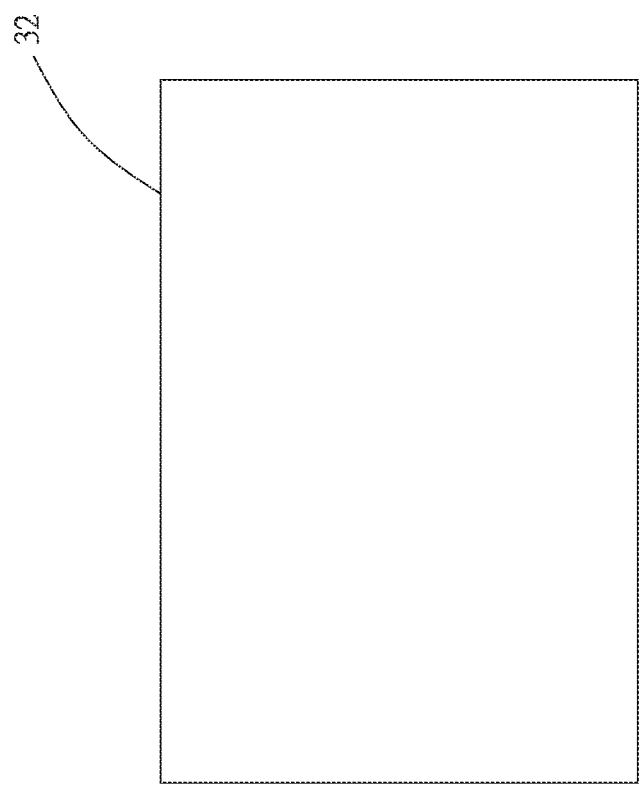
FIG. 9 is a schematic diagram of another detected image in accordance with FIG. 8.

In the preceding detecting and judging step (C) as shown in FIG. 6, if the surface defect 14 is located on the test surface of the transparent film and has a predetermined thickness, then part of the light beam 21 emitted by the light source 21 will be blocked by the surface defect 14 and will not be reflected from the front surface 12 or back surface 13 of the transparent film 11 to the camera 31. Additionally, with more than 70% of the light reflected by the transparent film 11 entering the camera 31, the resulting image will have a dark area DA, as shown in FIG. 7. There is the dark area DA in the acquired image 32 as shown in FIG. 6 since the surface defect 14 is located on the test surface of the transparent film and has a predetermined thickness and the light is incident at an angle, the area covered by the light blocked by the surface defect 14 will be longer than the length of the surface defect 14. Therefore, the dark area DA in the image to be evaluated 32 corresponding to the surface defect 14 will appear to be even longer, which also causes the dark area DA to be elongated in the direction of illumination. In other words, if the surface defect 14 is a circular object, the resulting dark area DA will appear proportionally longer than wider. The length of the dark area DA depends on the projection angle θ of the light source 21 and the height of the surface defect 14. In the case shown in FIG. 7, the length is three times the width. It can be seen that the shape ratio of the dark area DA is necessarily longer in length than the original ratio of the surface defect 14. Moreover, as shown in FIG. 8, if the surface defect 14 is located on the back surface of the transparent film, it means that there is no protrusion on the surface of the transparent film 11 to obstruct the light, and the light from the light source 21 will not be obstructed and reflected from the surface of the transparent film 11 to the camera 31. As a result, as shown in FIG. 9, the obtained image 32 of the camera 31 will not have the dark area DA. Therefore, it can effectively determine whether the surface defect 14 is on the front or back surface of the transparent film.

Through the preceding steps, the disclosure can effectively determine whether the surface defect 14 is on the surface or the back of the transparent film 11. In addition, the disclosure uses a simpler structure than previous techniques, without using a semi-reflecting mirror and without using two sets of cameras 31 set on the same optical axis, to effectively determine whether the surface defect 14 of the transparent film 11 is on the surface or the back.

Figure 3:
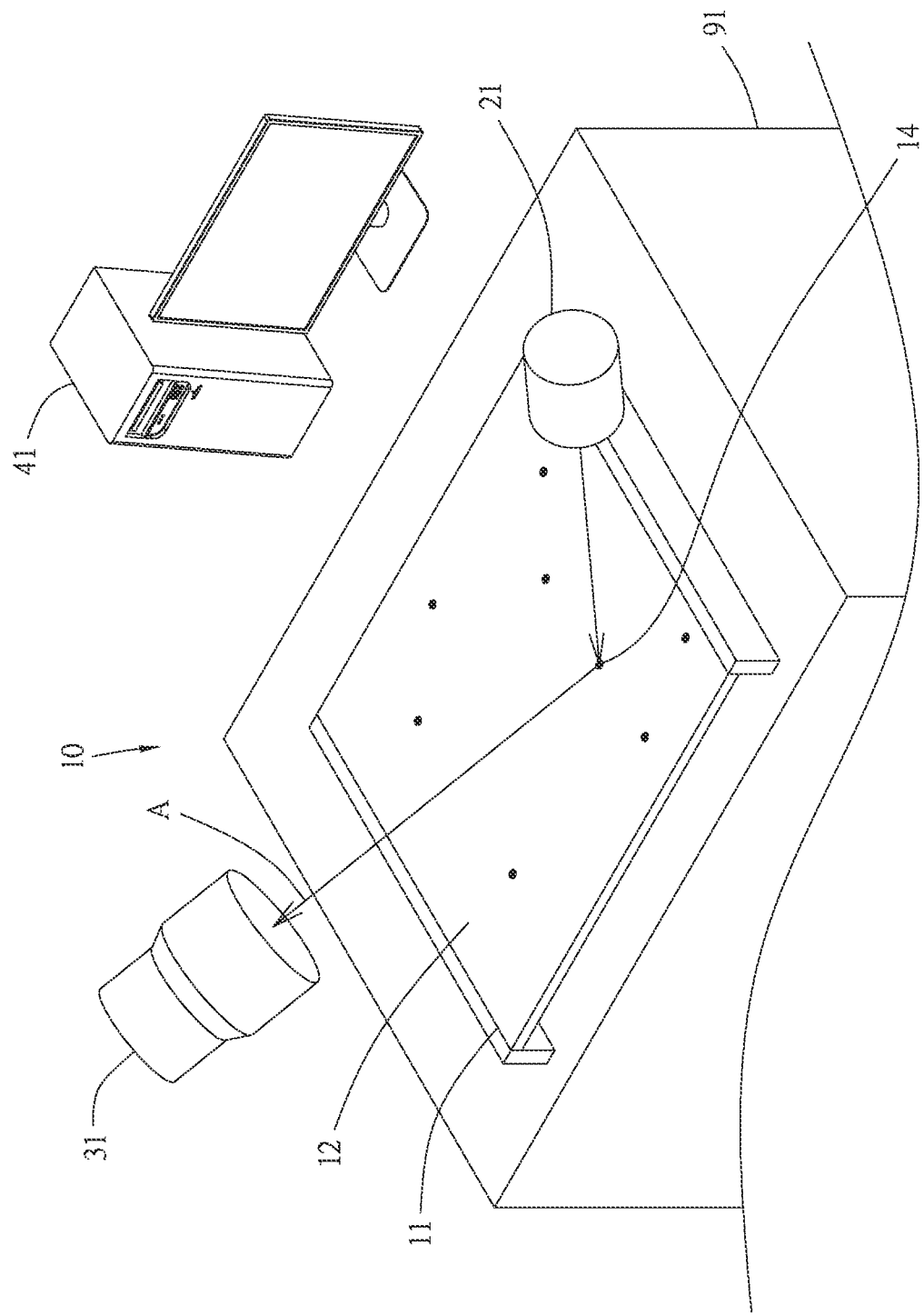
FIG. 3 is a schematic diagram of one structure according to the first preferred embodiment of the present disclosure.
Figure 4:
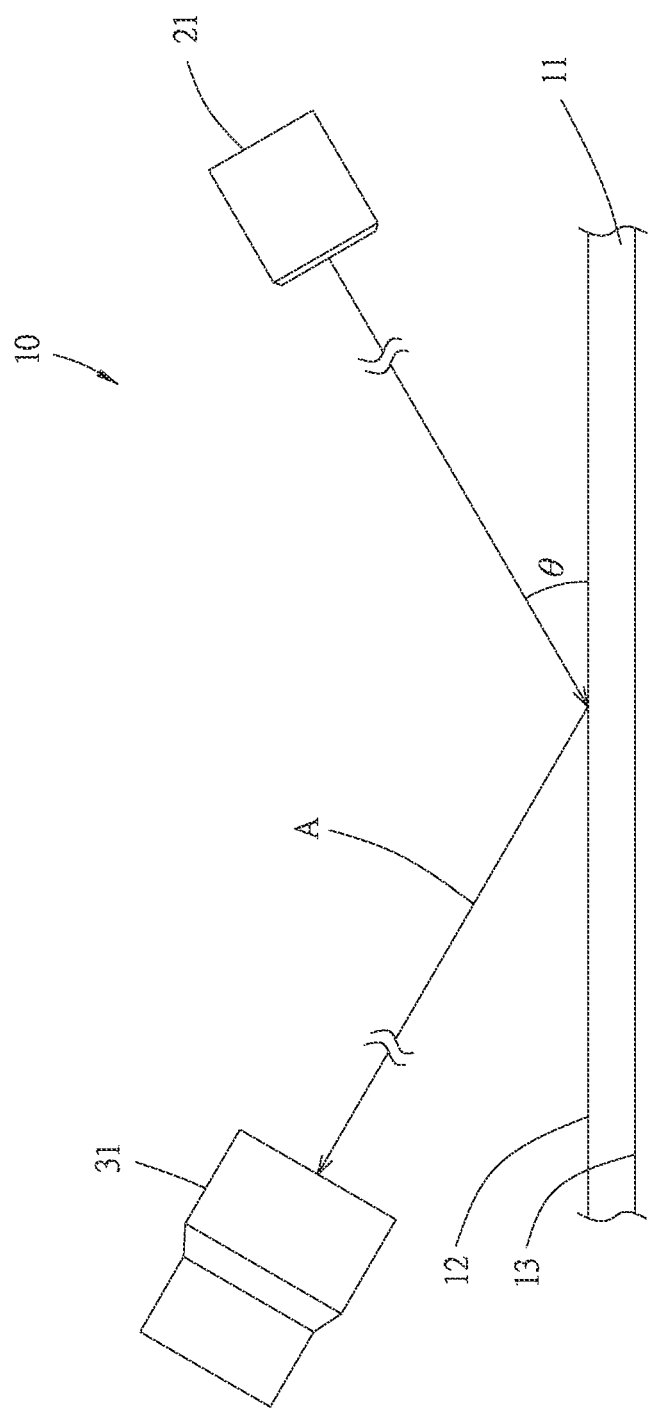
FIG. 4 is a schematic diagram of one action of the first preferred embodiment of the present disclosure, showing one detection status of the first preferred embodiment of the present disclosure.
Figure 5:
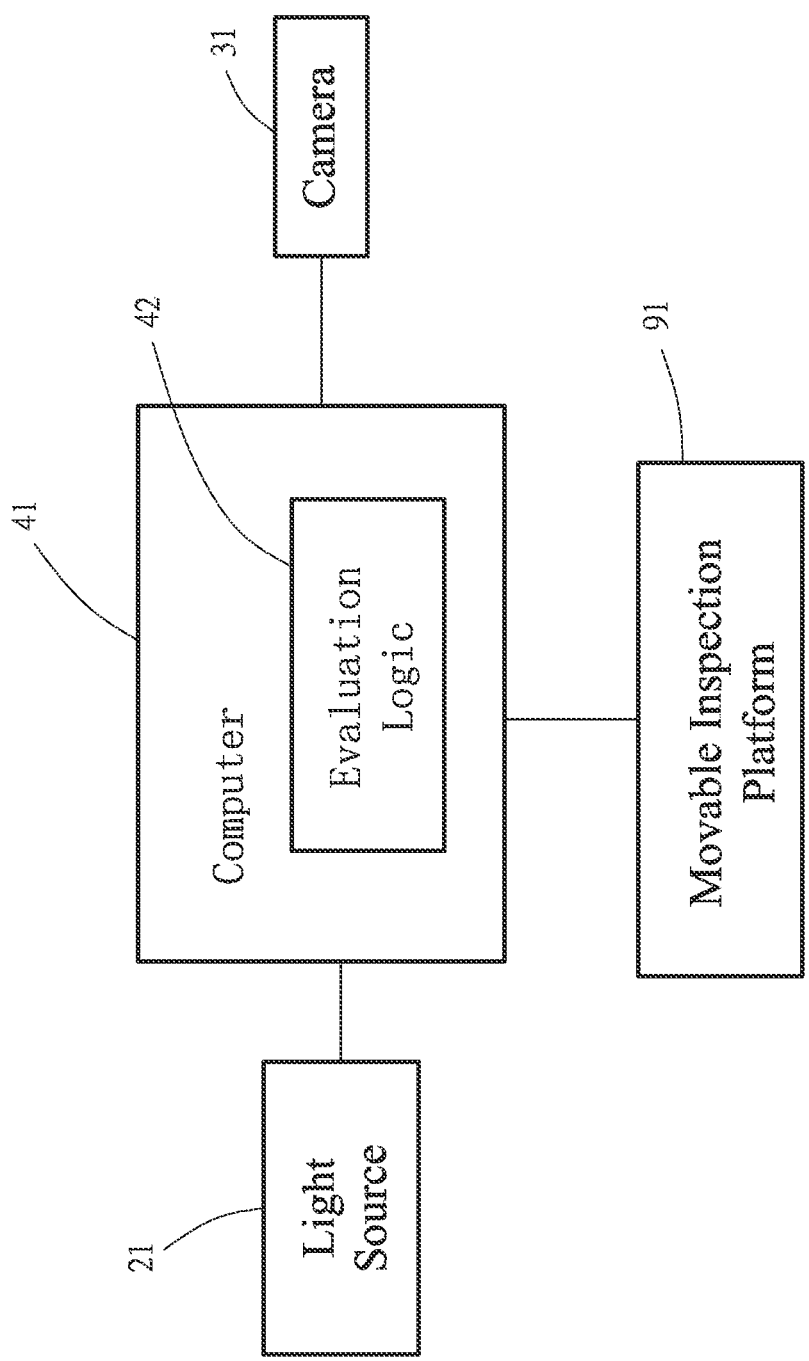
FIG. 5 is a block diagram of the first preferred embodiment of the present disclosure.

As shown in FIGS. 3 to 5, the preceding steps can be performed using the detection system 10 that can determining whether a defect on the surface of a transparent film is located on the film surface or on the film back, The detection system 10 for determining the location of transparent film surface defects on the film surface or film back is mainly composed of the movable inspection platform 91, light source 21, and camera 31, where:

The movable inspection platform 91 is used to place the transparent film 11, which has the front surface 12 and surface defect 14. The coordinates of the surface defect 14 on the transparent film 11 are stored in the computer 41. The movable inspection platform 91 can be controlled by the computer 41 to move the transparent film 11 in the X and Y directions, so that each of the surface defects 14 is located in the illumination position of the light source 21 for detection.

The light source 21 shines on the front surface 12 with a light projection angle θ that is projected at 30 degrees relative to the surface as an example. After the light is emitted on the front surface 12, one part of the light will be reflected on the test surface 12, and another part of light will penetrate the transparent film 11 and be reflected on the back surface 13. The light source 21 is used to control the movement of the transparent film 11 to align the position of the surface defects 14 with the light source 21 when the movable inspection platform 91 moves. The light is emitted and directed to each surface defect 14 by the computer 41.

The camera 31, in cooperation with each of the light sources 21, takes images of each of the surface defects 14. The camera 31 is located on the light axis A of the light that should be projected after the light emitted by the light source 21 is reflected without being obstructed by the front surface 12 to be inspected, and is controlled by the computer 41 to obtain multiple images 32 from the light reflected from both the front surface 12 and the back surface 13 of the transparent film 11.

Wherein, the computer 41 executes the aforementioned evaluation logic 42 to determine each of the images 32, and the content of the evaluation logic 42 is as set forth in the aforementioned step (C).

Each of the aforementioned components can be set on a machine (not shown in the drawings), and the technology of setting the components on the machine is directly understood by a person with ordinary knowledge in the technical field, so it is not possible to describe and graphically represent them in detail.

The aforementioned detection system 10 for determining whether the defect is on the front or back surface of the transparent film can be used to perform the above method, and to determine whether the defect is located on the front or back surface of the film.

As shown in FIGS. 10-18, a second preferred embodiment of the present disclosure provides a detection method that can be used to determine whether a defect on the surface of a transparent film is located on the front or back surface of the film.

In method step (A), in addition to the light source 21 in the first embodiment, a side light source 26 is further included, and the angle of projection on the front surface 12 is defined as a side projection angle, and the side projection angle is set to be substantially the same as the projection angle θ of the light source 21 in practice, so it is expressed in the figure only by the projection angle θ. In addition, the angle of view from above to below for the front surface 12 to be inspected as a horizontal surface, the direction of projection of the light source 21 is not parallel to the direction of projection of the side light source 26, but is interposed at a predetermined angle, which in this second embodiment is 90 degrees, i.e., perpendicular.

Figure 10:
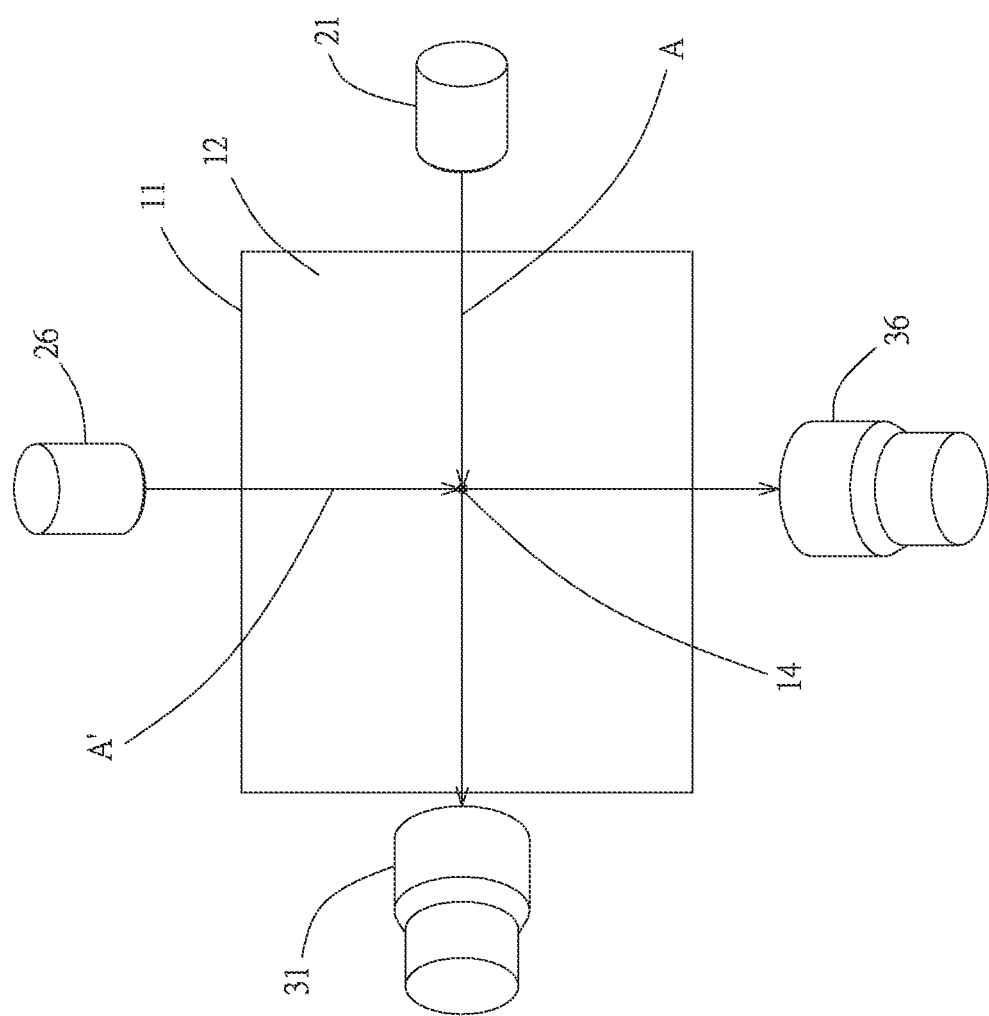
FIG. 10 is a schematic diagram of another structure according to a second preferred embodiment of the present disclosure.

In method step (B), as shown in FIG. 10, in addition to the camera 31 in the first embodiment, it also includes a side camera 36. The side camera 36 is located on the light axis A' of the light emitted by the side light source 26, which should be unobstructedly reflected from the front surface 12 to be inspected and the back surface (not shown in the figure), in order to image the light reflected from the front surface 12 to be inspected and obtain multiple side images 37 for determination thereof.

In method step (C), the computer performs the evaluation logic 42. In the second embodiment, the content of the evaluation logic 42 includes not only the content of the first embodiment, but also the method of judging the plurality of images 32 for judging the side image 37. In addition, the content of the evaluation logic 42 includes: if the same defect 14 in the same corresponding image 32 has the dark area DA and the corresponding side image 37 has a dark area DA', and the length-to-width ratio of the dark area DA and the dark area DA' is different, then the surface defect 14 is judged to be located on the test surface of the transparent film with a predetermined thickness; and if the same surface defect 14 in the same corresponding image 32 has the dark area DA and the corresponding side image 37 also has the dark area DA', but the length-to-width ratio of the dark area DA and the dark area DA' is the same, then the surface defect 14 is judged to be located on the back surface of the transparent film. The reason for this ruling condition is mainly to further judge special defect states. This special defect state may be a stain similar to ink existing on the back surface of the transparent film 11, and it may still be mistakenly recognized as a dark area DA due to partial darkness in the imaging. The detailed situation is explained below.

Figure 11:
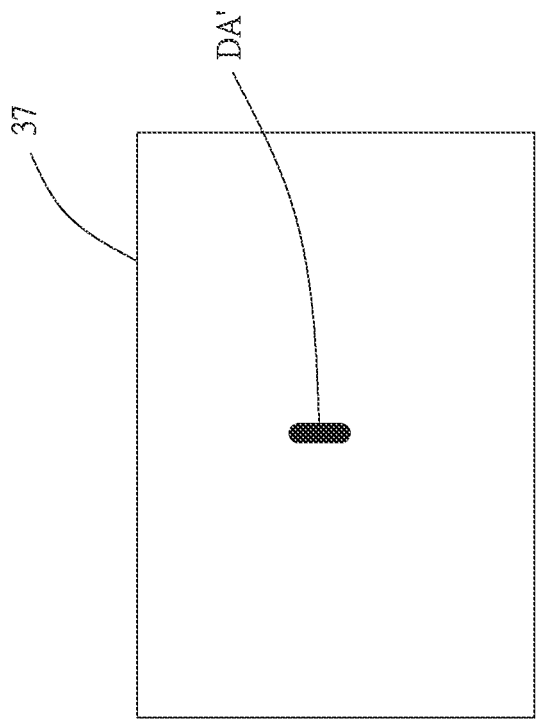
FIG. 11 is a schematic diagram of one image of the second preferred embodiment of the present disclosure.
Figure 12:
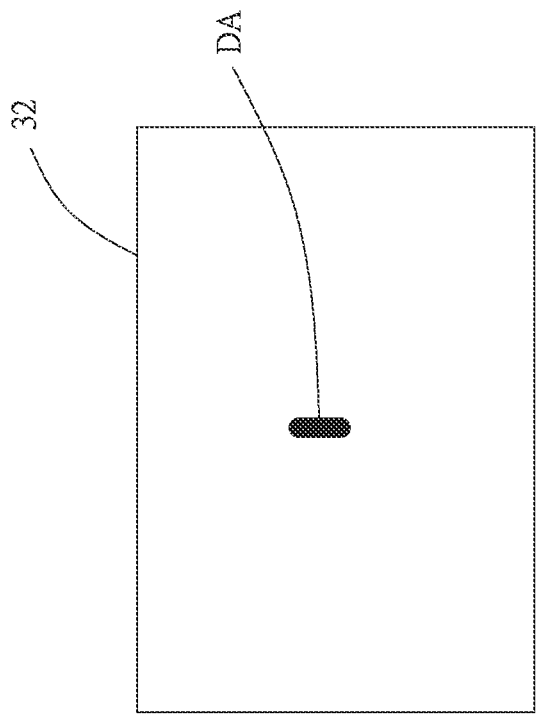
FIG. 12 is a schematic diagram of another image of the second preferred embodiment of the present disclosure.

As can be seen from FIGS. 11 and 12, if the surface defect 14 appears as a spherical shape on the front surface of the film with a predetermined thickness as shown in FIG. 6, then the dark area DA in the image 32 and the dark area DA' in the side image 37 will both appear with an aspect (length-to-width) ratio of more than two. However, even though it appears with the aspect ratio of more than two in the captured image, due to the perpendicular imaging angles of camera 31 and side camera 36, the aspect ratio of the dark area DA is equivalent to the aspect ratio compared to the dark area DA'. Therefore, although they may appear similar in the image, it must be considered that the aspect ratios of the dark area DA and the dark area DA' are different.

Figure 13:
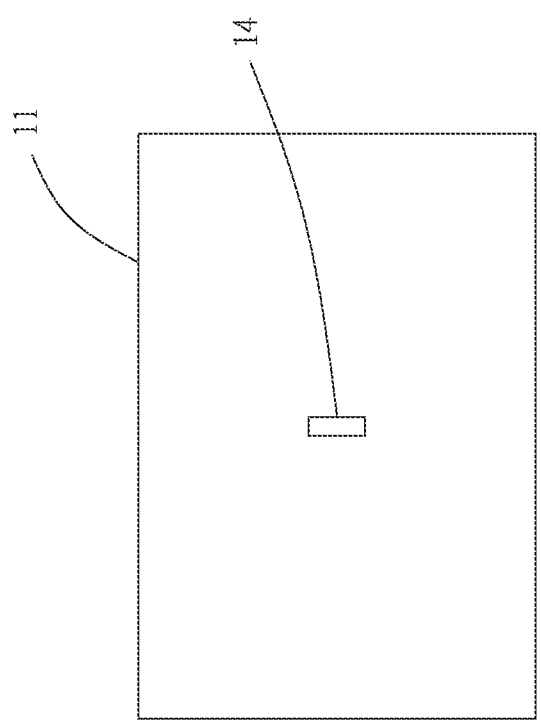
FIG. 13 is an illustration of another defect located on a front surface of the transparent film according to the second preferred embodiment of the present disclosure.
Figure 14:
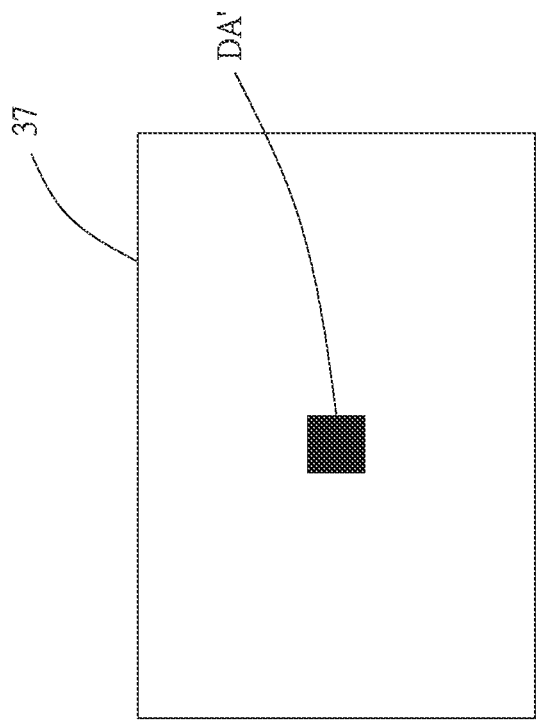
FIG. 14 is an illustration of one image of the surface defect of FIG. 13.
Figure 15:
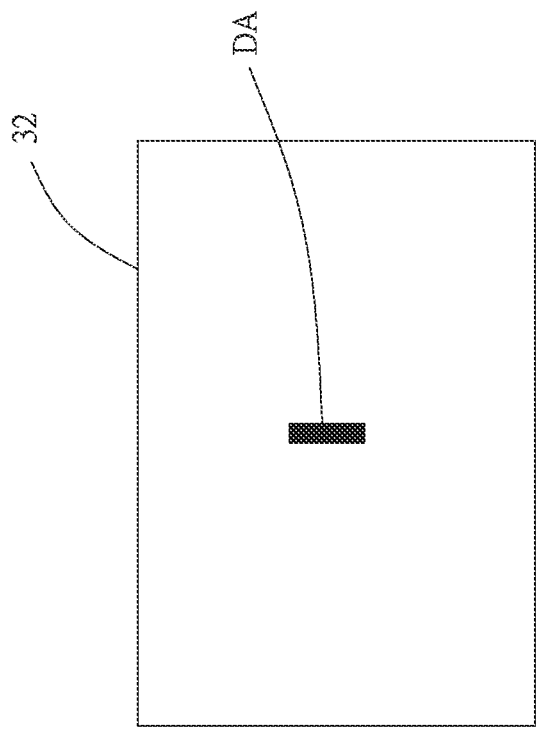
FIG. 15 is an illustration of a side image of the surface defect of FIG. 13.

As shown in FIG. 13, if the surface defect 14 is in a rectangular shape on the front surface of the film and has a predetermined thickness, then the dark area DA in the image 32 and the dark area DA' in the side image 37 will appear more clearly with different aspect ratios, as shown in FIGS. 14 and 15.

Figure 16:
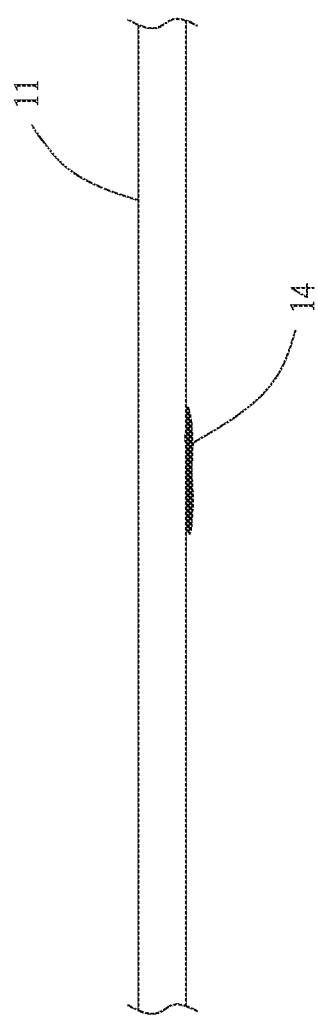
FIG. 16 is an illustration of yet another surface defect as a stain located on a back surface of the transparent film according to the second preferred embodiment of the disclosure.
Figure 18:
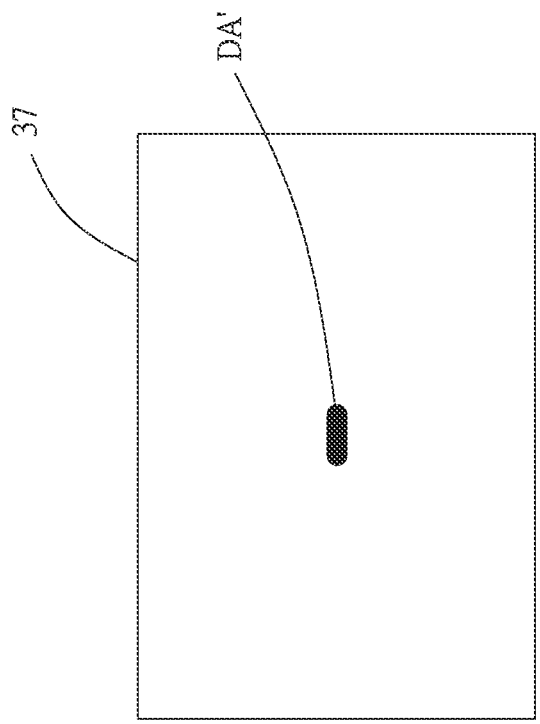
FIG. 18 is an illustration of another side image of the surface defect of FIG. 16.
Figure 17:
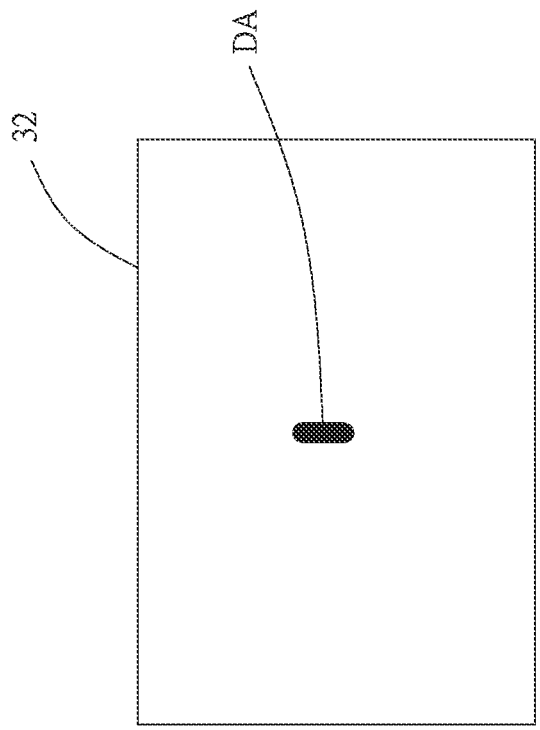
FIG. 17 is an illustration of another image of the surface defect of FIG. 16.

As shown in FIG. 16, if the defect is in a long shape, on the back surface of the transparent film, and is a very thin stain, then the dark area DA in the captured image 32 and the dark area DA' in the side image 37 will appear in a state where their aspect ratios are the same, as shown in FIGS. 17 and 18.

From the aforementioned steps, it can be seen that for a single surface defect 14, the technique provided in the second embodiment can detect the surface defect 14 in different directions, and then accurately determine whether it is located on the front or back surface of the transparent film 11. In contrast to the first embodiment, which is merely capable of distinguishing general surface defects with thickness (such as dust) on the front or back surface of the film, and such can result in misjudging of stains. However, in the second embodiment, even the stains and/or similar defects can be accurately determined as being on the front or back surface of the film.

Regarding the system used to carry out the steps described in the second embodiment, in addition to the movable inspection platform 91, the light source 21, the camera 31, and the computer 41 as disclosed in the first embodiment, there are a side light source 26 and a side camera 36. The spatial arrangement of these components is explained in the preceding steps and diagrams of the second embodiment and will not be repeated here.

The remaining technical features and achievable effects of the second embodiment are generally the same as those of the first embodiment, and therefore will not be repeated here.

What is claimed is:

1. A detection method for determining whether a surface defect on a transparent film is located at a front surface or a back surface of the transparent film, comprising the steps of:

preparing step (A) to prepare the transparent film having the surface detect located on a test surface with at a fixed coordinate to determine whether the surface defect is located on the front surface or the back surface of the transparent film, and to prepare a light source to shine on the test surface with an illumination angle of less than 45 degrees;

illuminating and imaging step (B) to use a light source in illuminating the surface defect at the fixed coordinate position on the test surface, and capturing an image of the surface defect with a camera, which is positioned on a light axis as reflected by the test surface without any obstruction in order to capture the reflected light from both the front and back test surface of the transparent film, wherein at least one image is obtained for judging, and the illumination angle is adjusted based on the surface reflectivity of the transparent film to ensure that 70% or more of the reflected light is captured by the camera; and detecting and judging step (C) to use a computer in executing an evaluation logic to determine whether the surface defect in the image is located on the front surface of the transparent film with a predetermined thickness if a first dark area is present in the image, or on the back surface of the transparent film if the first dark area is not present in the image, wherein in step (A), there is a side light source that illuminates the test surface at an angle as defined by a side illumination angle, which is substantially the same as the illumination angle of the light source, and when viewed from above the test surface, which serves as a horizontal plane, the irradiation directions of the light source and the side light source are not parallel but are at a predetermined angle, wherein in step (B), there is a side camera that is located on an axis of the light emitted by the side light source and reflected unobstructedly from the test surface, for imaging the light reflected from the front and back surfaces of the transparent film to obtain at least one side image to be evaluated, and wherein in step (C), the computer executes the evaluation logic to evaluate the side image, if there is a second dark area in the side image, and the length-to-width ratio of the second dark area in the side image is different from that of the first dark area in the image, then the surface defect corresponding to the side image is determined to be located on the front surface of the transparent film and has a predetermined thickness, if the second dark area is not present in the side image, then the surface defect corresponding to the side image is determined to be located on the back surface of the transparent film, and if the second dark area is present in the side image, and the length-to-width ratio of the second dark area in the side image is the same as that of the first dark area in the image, then the surface defect corresponding to the side image is determined to be located on the back surface of the transparent film.

2. The detection method for determining whether the surface defect on the transparent film is located on the front or back surface of the transparent film according to claim 1, wherein in step (A), the surface defect is of a plurality of surface defects, wherein in step (B), each of the surface defects is illuminated and imaged separately, resulting in multiple images corresponding to each of the surface defects; and wherein in step (C), the computer is used to judge each of the images to determine the location of each of the surface defects.

3. The detection method for determining whether the surface defect on the transparent film is located on the front or back surface of the transparent film according to claim 1, wherein in step (A), the illumination angle is of 30 degrees, and 90% of light obtained by the camera is reflected by the transparent film.

4. The detection method for determining whether the surface defect on the transparent film is located on the front or back surface of the transparent film according to claim 1, wherein in step (A), the defect is of multiple defects; in step (B), each of the defects is irradiated and imaged separately to obtain a plurality of images corresponding to each of the defects and a plurality of side images; and in step (C), the computer is used to separately judge each of the images and each of the side images.

5. The detection method for determining whether the surface defect on the transparent film is located on the front or back surface of the transparent film according to claim 1, wherein in step (A), the illumination angle and the side illumination angle are both of 30 degrees, and 90% of the light emitted by the light source and the side light source, which are captured by the camera, is reflected by the transparent film.

6. The detection method for determining whether the surface defect on the transparent film is located on the front or back surface of the transparent film according to claim 1, wherein a first illumination direction of the light source is perpendicular to a second illumination direction of the side light source, when viewed from above the test surface in a horizontal plane.

7. A detection system for determining whether a surface defect on a transparent film is located at a front surface or a back surface of the transparent film, comprising:
a movable inspection platform for holding a transparent film with a test surface, at least one surface defect having a fixed coordinate stored in a computer, and ability to move the transparent film in X and Y directions using a computer;
a light source for emitting light at an illumination angle of less than 45 degrees in a direction of the test surface, and illuminating the surface defect when the movable inspection platform is moved to align the fixed coordinate of the surface defect with an illumination position of the light source; and
a camera that images the surface defect, which is positioned on an optical axis of the light reflected from the front and back surfaces of the transparent film by the light source, and obtains an image, wherein the illumination angle is adjusted based on a surface reflectance of the transparent film to ensure that at least 70% of the light in the image is reflected by the transparent film,
wherein the computer executes an evaluation logic to make determination on the image, wherein if there is a dark area in the image, the computer determines that the surface defect is located on the front surface of the transparent film and has a predetermined thickness, and if there is no dark area present in the image, the computer determines that the surface defect is located on the back surface of the transparent film, and
wherein the system includes a side light source and a side camera, the side light source illuminates the test surface at an angle as defined by a side illumination angle, which is substantially the same as the illumination angle of the light source, and in addition, when viewed from above the test surface in a horizontal plane, an illumination direction of the light source is not parallel to another illumination direction of the side light source, but rather at a predetermined angle, and the side camera is positioned on a light axis of the light emitted from the side light source and reflected off the test surface in order to capture a side image using the light reflected from both the front and back surfaces of the transparent film, and to obtain the side image for analysis, with the computer executing the evaluation logic to analyze the side image.

8. The detection system for determining whether the surface defect on the transparent film is located on the front surface or the back surface of the transparent film according to claim 7, wherein the illumination angle is of 30 degrees with 90% of the light being reflected from the test surface.

9. The detection system for determining whether the surface defect on the transparent film is located on the front surface or the back surface of the transparent film according to claim 7, wherein the illumination angle and the side illumination angle are both 30 degrees and 90% of the light emitted by the light source, and the side light source is reflected by the transparent film and captured by the camera.

10. The detection system for determining whether the surface defect on the transparent film is located on the front surface or the back surface of the transparent film according to claim 7, wherein a first projection direction of the light source is perpendicular to a second projection direction of the side light source, using the test surface as the horizontal plane.

* * * * *